Figure 1:
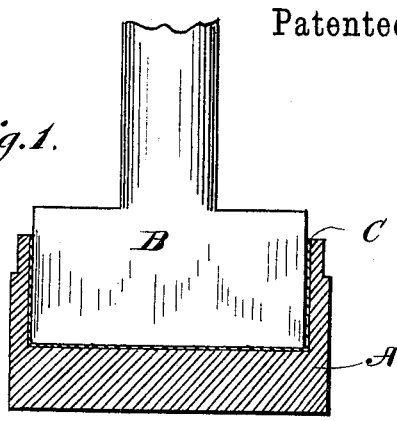

(Model.)

E. W. GROVE.
MODE OF FORMING COMMERCIAL PACKAGES OF GUMS, &c.

No. 266,810. Patented Oct. 31, 1882.

Witnesses:
C. D. Hyer.
J. A. Rutherford

Inventor:
Edwin W. Grove.
By James L. Norris.
Attorney

UNITED STATES PATENT OFFICE.

EDWIN W. GROVE, OF PARIS, TENNESSEE.

MODE OF FORMING COMMERCIAL PACKAGES OF GUMS, &c.

SPECIFICATION forming part of Letters Patent No. 266,810, dated October 31, 1882.

Application filed July 25, 1882. (Specimens.)

*To all whom it may concern:*

Be it known that I, EDWIN W. GROVE, a citizen of the United States, residing at Paris, in the county of Henry and State of Tennessee, have invented new and useful Improvements in Putting up Plastic Material, of which the following is a specification.

Heretofore certain gums capable of being reduced to a plastic condition have been sold in the market, both in the mass and in small quantities, put up in boxes. This applies to all that class of gums of which catechu, asafetida, licorice, extract of logwood, &c., in their crude state are examples.

It has been found exceedingly inconvenient to retail these gums thus put up, since they are extremely hard and difficult to break, and in breaking them the use of an ax, hatchet, or other heavy implement is rendered necessary. But it is even difficult to break those gums with such instruments, and, moreover, in cutting or breaking them up it is not an easy matter to get any exact weight, so that the seller is in most instances obliged, when small lots are to be sold, to give a greater quantity than that called for at a given price, thus rendering their sale extremely inconvenient. Moreover, the handling of such gums is disagreeable. When, on the other hand, these gums are put up in boxes of any size, it has been usual to employ a metal box in order that heat may be applied to soften the contents and enable the gum to be removed. The cost of these boxes and the difficulty of removing their contents has led to the adoption of the invention hereinafter described.

It is the object of this invention to obviate all such objections, and to such end I reduce said gums to a plastic state and mold them into cakes of different sizes and specific weights—say one ounce, two ounces, four ounces, eight ounces, sixteen ounces—as hereinafter described, which said cakes can be readily handled, supplied to the market, and retailed without breakage of the cake or parcel.

In carrying out my invention I take a given quantity of the gum—say one hundred pounds—and place it in an iron or other suitable kettle of about thirty gallons capacity. I then add about one gallon of water to the gum within the kettle, and heat the same until the water has been absorbed by the gum so as to form a plastic mass. While the gum is still hot I add in some instances a quantity of glycerine—say thirty-two ounces—so that the gum will be prevented from becoming hard and brittle when dry, but will be retained in a soft or plastic condition and capable of being conveniently molded or shaped in boxes or molds into blocks or cakes of different sizes for the market.

In further carrying out my invention I take a number of round or other desirably-shaped boxes made of metal or wood or other suitable material, adapted in size to hold the different quantities of gum before mentioned, and for each box or mold I employ a suitable plunger, by means of which I force a sheet of tinfoil or oiled paper into the mold and compress it against the sides thereof, so as to form a lining in the same, which will preferably extend slightly above the top of the box or mold. After thus preparing a desired number of such boxes or molds the gum in a plastic state, either hot or cold, is placed in the mold in any convenient way, being either poured in, if hot, or, if cold, placed therein by means of any suitable instrument. The filled molds or boxes are then set aside for a few days until the gum is sufficiently dry to retain its shape in shipping. The molds or boxes with the gum are then ready for shipment; or they can be turned bottom side up, and by lightly tapping on the bottoms of the same the molded cakes of gum will readily drop out nicely incased in foil in convenient sizes suitable for the market. It will be seen that if the gum were placed directly into the wooden mold that would adhere to the same; but by first placing a foil or other analogous lining therein the gum will adhere to the foil, which latter will not of course adhere to the mold. These packages can be labeled, giving the name of the gum and the quantity in each cake or package. By this method the expense of boxes for putting up cheap gum is avoided, since after the gum has dried sufficiently to retain its shape there will be no further need for the box, and hence the cost of the latter is obviated. The foil serves as a sufficient covering or wrapper for the gum, and will be found serviceable in handling the packages.

In conclusion I will observe that some of the gums do not require the addition of water, but can be heated and while hot poured into the foil or other lined molds, from which the molded gum and foil wrapper will be removed after the gum has become cold.

Figure 2:
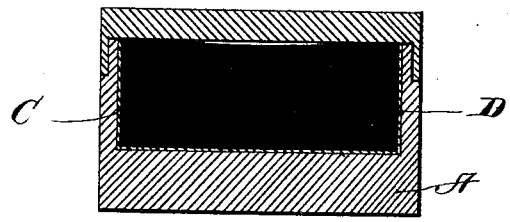
Figure 3:
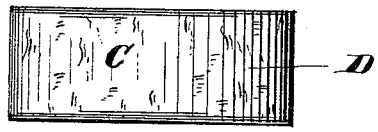

In the annexed drawings, Figure 1 represents a section taken on a vertical central plane through a wooden box or mold with the plunger in the act of compressing a sheet of foil within the mold or box, so as to form the temporary lining therefor. Fig. 2 illustrates the foil-lined mold filled with the plastic material. Fig. 3 shows the cake with its wrapper after it has been molded and removed from the mold.

The box A can be of wood or other suitable material and of any desired shape, either round or polygonal, as preferred.

B represents the plunger employed for forcing a sheet of oiled paper or foil, C, into the mold, so as to form the temporary lining.

D indicates the molded cake, which in Fig. 3 is shown removed with its wrapper, which in the first instance constituted a lining for the mold. Any number of these molds can be employed, and after having been filled, then relieved of their contents in the manner described, they can be again used for a like purpose; but, if desired, the molds can be lined, as already described, and then filled with the plastic or fluid gum, and the mold and its contents sold without removing the cake, such removal being left to the purchaser; also, the glycerine can be omitted, if desired, and the gum simply reduced to a plastic or fluid state by heat, and then filled into the foil or other lined box.

In conclusion I will remark that I can prepare vaginal-suppositories composed of cocoa-butter or the like with various medicaments in the same way that I put up the gum already described.

Having thus described my invention, what I claim is—

The process described of preparing plastic gums for the retail market in packages of assorted weight, said process consisting in lining a mold of suitable size with foil or equivalent material, melting the gum and pouring it into said mold, and thereafter, when the gum has set, removing it, together with the lining of foil, from the mold, said foil adapted to form a wrapper for the packages, substantially as described.

In testimony whereof I have hereunto set my hand in the presence of two subscribing witnesses.

EDWIN W. GROVE.

Witnesses:
ARTHUR B. LAMB,
S. H. WINSTEAD.